United States Patent [19]

Ruppert et al.

[11] Patent Number: 5,222,539
[45] Date of Patent: Jun. 29, 1993

[54] APPARATUS FOR IMPROVING THE FIT OF A TIRE ON A WHEEL

[75] Inventors: Franz Ruppert, Heppenheim; Georg Lipponer, Zwingenberg, both of Fed. Rep. of Germany

[73] Assignee: Hofmann Maschinenbau GmbH, Pfungstadt, Fed. Rep. of Germany

[21] Appl. No.: 709,876

[22] Filed: Jun. 4, 1991

[30] Foreign Application Priority Data

Jun. 22, 1990 [DE] Fed. Rep. of Germany ....... 4019992

[51] Int. Cl.⁵ .......................................... B60C 25/122
[52] U.S. Cl. ...................................... 157/1.21; 157/1; 73/146
[58] Field of Search .................. 157/1, 1.17, 1.2, 1.21; 73/146

[56] References Cited

U.S. PATENT DOCUMENTS

| 1,552,928 | 9/1925 | Hershon | 157/1.2 |
| 2,849,675 | 8/1958 | Hall et al. | 73/146 |
| 3,130,957 | 4/1964 | Branick | 73/146 |
| 3,973,615 | 8/1976 | Cunha | 157/1.21 |
| 4,673,016 | 7/1987 | Damman et al. | 157/1 |
| 4,886,101 | 12/1989 | Kinnick et al. | 157/1 |

FOREIGN PATENT DOCUMENTS 2945819  5/1981  Fed. Rep. of Germany.

Primary Examiner—James G. Smith
Attorney, Agent, or Firm—Cushman, Darby & Cushman

[57] ABSTRACT

An apparatus for improving the fit of a pneumatic tire on a wheel comprises a plurality a conical pressure rollers. A first pair of pressure rollers with their larger diameter positioned downwardly are arranged diametrically opposite each other with respect to the axis of the tire. A second pair of pressure rollers with their larger diameter positioned upwardly are arranged similarly diametrically opposite the pressure rollers with their larger diameter upwardly are arranged alternately with pressure rollers with their larger diameter downwardly in the peripheral direction of the tire.

8 Claims, 2 Drawing Sheets

APPARATUS FOR IMPROVING THE FIT OF A TIRE ON A WHEEL

BACKGROUND OF THE INVENTION

In some circumstances it may be appropriate or necessary to improve the fit of a pneumatic tire on a wheel such as a motor vehicle wheel, for example in a tire fitting apparatus and in particular in an automatic tire fitting assembly line. A typical form of apparatus for improving the fit of a pneumatic tire on a disc wheel, as is to be found in DE 38 23 721 A1, comprises a plurality of pressure rollers which are disposed in such a way that in use they are arranged around the periphery of the tire, and they can be pressed by means of inclined peripheral surfaces against the tire. The pressure rollers, being generally therefore of a conical configuration, are all arranged in such a way that they produce a downwardly directed force component which urges the wheel or the tire towards support rollers on which it is mounted. The degree of conicity of the pressure rollers is small in that apparatus so that the main force component exerted by the pressure rollers is directed generally radially inwardly against the tire in order thereby to ensure that the tire bead is correctly seated on the flange portion of the rim of the disc wheel. If however the apparatus produces an excessively inclined, downwardly directed force component, there is the danger of the tire being loaded thereby at only one side, which will accordingly result in the tire being seated in different ways at the two side flanges of the rim of the disc wheel. For example, in such a situation, it may happen that the fit of the tire at the upper flange portion of the wheel rim is improved while the seating of the tire at the other flange portion of the wheel rim may be made worse.

SUMMARY OF THE INVENTION

An object of the present invention is to provide an apparatus for improving the fit of a pneumatic tire on a wheel, which is adapted to avoid the above difficulty and provide a satisfactory fit at both bead seating surfaces on the wheel by means of a working force which is uniformly applied to the tire.

Another object of the present invention is to provide an apparatus for improving the fit of a pneumatic tire on a motor vehicle disc wheel, which can automatically provide for centering of the wheel with the tire in the apparatus for a fit-improving operation.

Yet another object of the present invention is to provide an apparatus for improving the fit of a pneumatic tire on a motor vehicle disc wheel which is of a simple and rational construction while affording reliable results in terms of the fit of the tire at both side beads thereof.

In accordance with the present invention, the foregoing and other objects are achieved by an apparatus for improving the fit of a pneumatic tire on a wheel such as a disc wheel and more particularly a motor vehicle wheel, comprising a plurality of pressure rollers which are so positioned that in use of the apparatus they are disposed around the periphery of the tire whose fit is to be improved. The pressure rollers are each of a generally conical configuration, and are so disposed that a first respective pair of pressure rollers have their larger diameter downwardly and a second respective pair of pressure rollers have their larger diameter upwardly, wherein the pressure rollers of the first pair are arranged diametrically opposite one another with respect to the axis of the tire and the pressure rollers of the second pair are arranged diametrically with respect to the axis of the tire, and wherein pressure rollers with their larger diameter upwardly are arranged alternately with pressure rollers with their larger diameter downwardly, in the peripheral direction around the tire.

The above-defined configuration in which, in accordance with the invention, the conical pressure rollers are arranged around the periphery of the tire when processing same in such a way that two pressure rollers whose larger diameter is downwardly and two pressure rollers whose larger diameter is upwardly are respectively arranged diametrically relative to each other, with respect to the axis of the tire, provides that the apparatus uniformly imparts to the tire a working or pressing force such as to improve the fit of the tire on the wheel. The bead seating surfaces of the tire are thus fitted into the two flange portions at the rim of the tire in a satisfactory manner. To give an example of use of the apparatus according to the invention, after a tire has been fitted on to a wheel such as a motor vehicle wheel, for example in a tire fitting apparatus and more especially for example in an automatic tire fitting assembly line, the disc wheel and tire unit can then be put into the apparatus according to the invention to ensure enhanced quality in terms of the fit of the tire on the wheel.

As indicated above, the pressure rollers are of a relatively conical configuration, with the cone angle of the generatrix of the conical configuration of each roller, relative to the axis of the roller, preferably being between about 10° and 20°, more especially being about 15°.

The fact that a pressure roller with its larger diameter upwardly and a pressure roller with its larger diameter downwardly occur in succession alternately around the periphery of the tire, and two rollers of a pair with their larger diameter upwardly and two rollers of a pair with their larger diameter downwardly are respectively arranged in diametrically opposite relationship, additionally provides a centering effect on the tire, not only in a lateral direction, that is to say horizontally when the tire is disposed in a horizontal position in the apparatus according to the invention, but also in a vertical direction; the vertical centering effect is caused by the cooperation of the conical configurations of the respective pressure rollers, which thus engage the tread surface of the tire at respective edges thereof to centralise the tire in relation to the mutually opposite conical configurations of the respectively adjoining pressure rollers.

In accordance with a preferred feature of the invention, the pressure rollers are driven so that in operation of the apparatus the wheel and tire thereon is driven in rotation by the driven pressure rollers.

In another preferred feature of that arrangement, in particular first and second pressure rollers have a common drive to provide the drive effect.

Another preferred feature of the invention provides that the apparatus includes a lifting means, more especially a hydraulic lifting means, for moving the wheel into a previously established central position between the pressure rollers.

Another preferred feature provides that the apparatus has an adjusting means for radial adjustment of the rollers, in order to adapt them to different wheel diameters. That can be effected by means of piston-cylinder units which are for example controlled by a pressure fluid or which may be preset by means of a program.

In accordance with still another preferred feature of the invention, the pressure rollers may be mounted eccentrically in order to improve the working or pressing force which they apply to the tire, thereby further to enhance the quality of the fit of the tire on the wheel. For that purpose the pressure rollers may have eccentric bores.

Further objects, features and advantages of the present invention will be apparent from the following description of a preferred embodiment thereof.

DESCRIPTION OF THE PREFERRED EMBODIMENT

Figure 1:
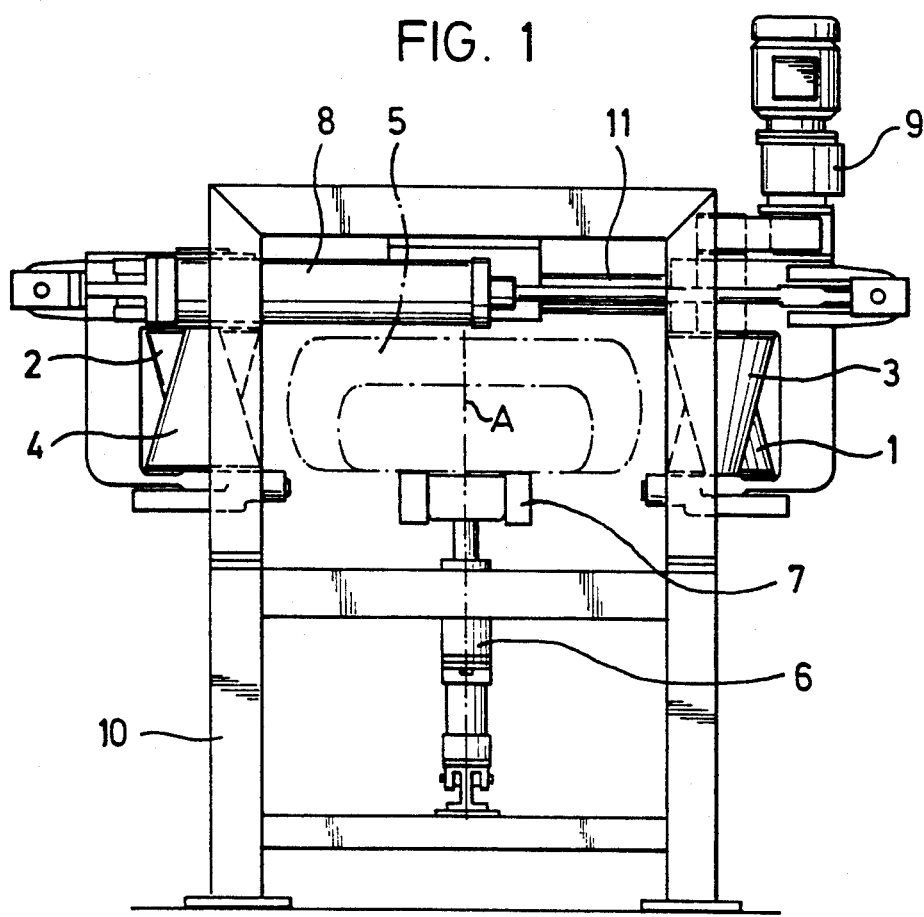
FIG. 1 is a front view of an apparatus according to the invention with which a uniform pressing force can be applied to a tire on a motor vehicle wheel.

Referring therefore now generally to the drawings, shown therein is an apparatus for improving the fit of a pneumatic tire on a disc wheel such as a motor vehicle wheel, comprising a machine frame structure 10 and first through fourth pressure rollers 1 through 4 which are displaceably mounted on the machine frame structure 10 on rails indicated at 11 in FIG. 1. The pressure rollers 1 through 4 are each of a generally conical configuration, with their cone angle, being the angle between the peripheral profile line and the axis of the respective roller, being between about 10° and 20° and more particularly about 15°. The conical configuration of the pressure rollers 1 through 4 can be clearly seen from both FIGS. 1 and 3.

Disposed in the center of the machine frame structure 10 is a lifting device 6 which may be for example pneumatically or hydraulically actuable. At its upper end the lifting device 6 has a support table or platform 7 which in particular is a roller table provided with crossed support rollers. The support table 7 is designed to receive a wheel such as a motor vehicle wheel, for example in the form of a disc wheel, with a pneumatic tire fitted thereon, as indicated at 5, so that, when the wheel with tire 5 is supported on the table 7, the wheel with tire 5 can then be lifted by the lifting device 6 into a substantially centrally disposed position between the pressure rollers 1 through 4. As shown in FIG. 1 by the dash-dotted lines, the apparatus can accommodate different sizes of wheel and tire between the pressure rollers 1 through 4.

Figure 2:
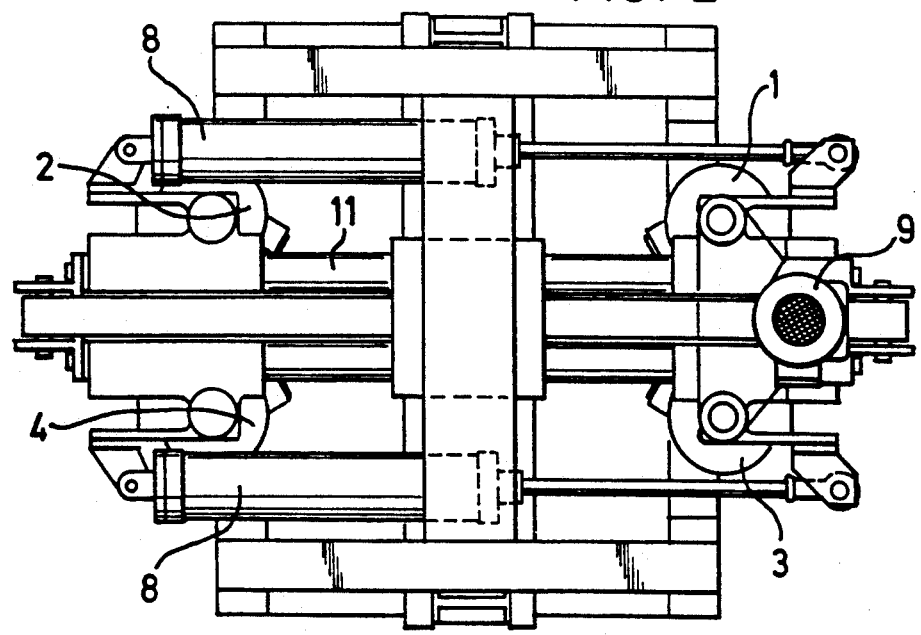
FIG. 2 is a plan view of the apparatus shown in FIG. 1.

For the purposes of adjustment of the pressure rollers 1 through 4 relative to the wheel-tire unit 5, or for moving the pressure rollers radially towards and away from the wheel-tire unit 5, the apparatus further includes drive means illustrated as piston-cylinder units indicated at 8 in FIGS. 1 and 2, which are hydraulically or pneumatically actuable. By means of the piston-cylinder units 8, the pressure rollers 1 through 4 can be applied to the surface of the tire, by movement of the pressure rollers 1 through 4 along the rails 11. The pressure-cylinder units 8 may be pressure-controlled or preset by way of a suitable program.

During the operation of improving the fit of the tire on the wheel, the pressure rollers 1 through 4 are driven, for which purpose the apparatus includes a drive unit indicated at 9. In the illustrated embodiment the drive unit 9 is a common drive unit for the drive rollers 1 and 3. When the wheel-tire unit 5 is driven by way of the two driven pressure rollers 1 and 3 therefore, the other two pressure rollers 2 and 4 are also entrained by virtue of the rotary movement of the wheel-tire unit 5.

The pressure rollers 1 through 4 may be mounted eccentrically, for which purpose they have eccentric mounting bores. That eccentric mounting will improve the squeezing or working force applied to the tire in operation of the apparatus.

Figure 3:
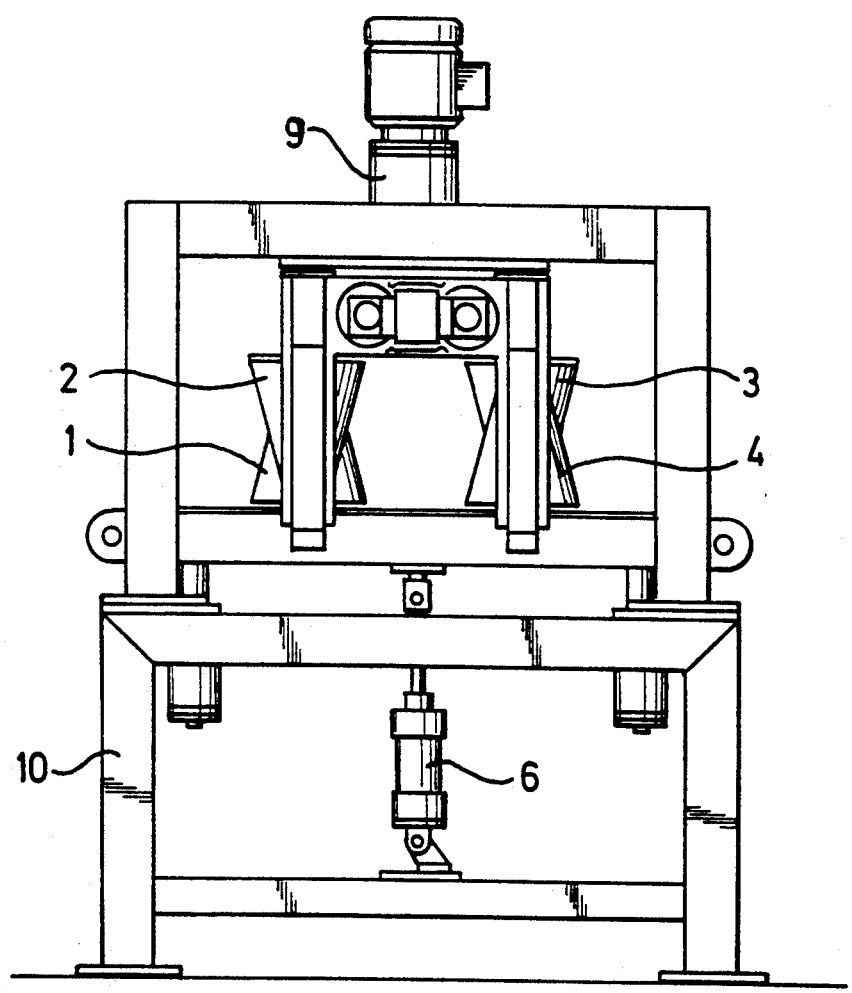
FIG. 3 is a side view of the apparatus shown in FIG. 1.

As can be seen in particular from FIGS. 1 and 3, and as indicated above, the pressure rollers 1 through 4 are of a conical configuration. The pressure rollers 1 and 4 have their larger diameter disposed downwardly, and those two pressure rollers are disposed diametrically opposite with respect to the axis of the wheel, as indicated at A in FIG. 1. The other two pressure rollers 2 and 3 have their larger diameter upwardly, and they are also arranged diametrically opposite each other, with respect to the axis A of the wheel. As viewed in the peripheral direction of the wheel-tire unit 5, a pressure roller with its larger diameter upwardly, for example the pressure roller 2, is followed by a pressure roller with its larger diameter downwardly, for example the pressure roller 1, and so forth. In other words, pressure rollers with their larger diameter upwardly are arranged alternately with pressure rollers with their larger diameter downwardly, in the peripheral direction of the tire.

As can be seen in particular from FIG. 1, each pressure roller 1 through 4, by virtue of its relatively large conicity, applies to the peripheral or tread surface of the tire a force component which is inclined with respect to the axis A of the wheel. Those force components are added together so that a resultant uniform working or squeezing force is applied to the tire over the tread surface thereof, and that contributes to ensuring a uniform fit for the tire on the flange portions of the rim of the wheel. The pressure rollers 1 through 4 also produce a centering effect in a vertical direction. If the profile lines of each two pressure rollers 2, 4 and 1, 3 respectively are added, it will be seen that the resulting profile line is approximately adapted to the configuration of the tire surface, as can be clearly seen for example from FIGS. 1 and 3, although, as already mentioned, inclined force components are applied to the tire by each pressure roller. Furthermore, the eccentric mounting of each pressure roller results in a wobbling movement of the conical pressure rollers about their respective axes, and that can contribute to enhancing the effect of the working or pressing force to produce an improvement in the fit of the tire on the wheel.

It will be appreciated that the above-described apparatus has been set forth solely by way of example and illustration of the principles of the present invention and that various other modifications and alterations may be made therein without thereby departing from the spirit and scope of the invention.

I claim:

1. An apparatus for improving the fit of a pneumatic tire on a disc wheel comprising:
    a support means for supporting a wheel with a tire thereon in the apparatus;
    a plurality of pressure rollers disposed around said support means at spacings from each other there-around, each pressure roller being of a conical configuration and the pressure rollers being disposed around the support means in an array in which the conical configuration of each pressure roller is reversed with respect to the conical configuration of the respectively adjacent pressure roller, and the rollers which are disposed in mutually diametrically opposite relationship with respect to an axis of the tire have the larger diameter of their conical configuration at the same respective side of said array; and means for urging the pressure rollers with their conical surfaces towards the tire.

2. An apparatus for improving the fit of a pneumatic tire on a wheel comprising:
- a plurality of pressure rollers, the pressure rollers being disposed around a periphery of the tire, the pressure rollers each being of a conical configuration,
- at least a first set of two pressure rollers located diametrically opposed, with respect to an axis of the tire, about the periphery of the tire and having their larger diameter positioned downwardly,
- at least a second set of two pressure rollers located diametrically opposed, with respect to an axis of the tire, about the periphery of the tire and having their larger diameter positioned upwardly, said at least first and second sets of pressure rollers being arranged alternately arranged about the tire; and
- an activating mechanism operatively pressing the conical surfaces of each of the pressure rollers against the tire.

3. An apparatus as set forth in claim 2 further including means for driving the pressure rollers.

4. An apparatus as set forth in claim 2 wherein the plurality of pressure rollers include only four pressure rollers.

5. An apparatus as set forth in claim 2 further including a lifting means for moving the disc wheel with the tire into a central position between the pressure rollers.

6. An apparatus as set forth in claim 2 wherein each pressure roller has an angle between the peripheral profile line and the axis of the roller of between about 10° and 20°.

7. An apparatus as set forth in claim 6 wherein said angle is about 15°.

8. An apparatus as set forth in claim 2 wherein the pressure rollers are adjustable for different wheel diameters.

* * * * *